United States Patent Office 3,509,029
Patented Apr. 28, 1970

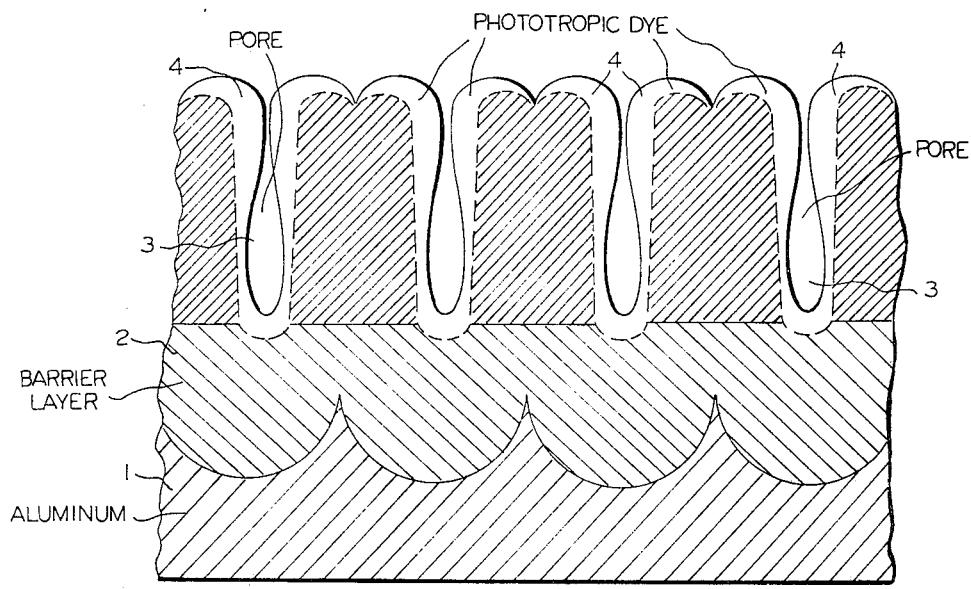

3,509,029
PHOTOTROPIC FINISHED ANODIZED ALUMINUM DOSIMETER
Howard G. Lasser, 5912 Camberly Ave., Springfield, Va. 22150, and Sidney Levine, 3 Pooks Hill Road, Bethesda, Md. 20014
Filed Dec. 16, 1966, Ser. No. 602,415
Int. Cl. C23f *17/00;* C23b *9/02;* G01t *1/04*
U.S. Cl. 204—38         1 Claim

ABSTRACT OF THE DISCLOSURE

A dosimeter with an anodized aluminum base has a phototropic material dyed into the aluminum oxide formed by the anodizing to provide a radiation detector for personal use and to provide a radiation detector in structural units such as door knobs, door facings and the like.

---

The invention described herein may be manufactured and used by or for the Government of the United States of America for governmental purposes without the payment to us of any royalties thereon.

BACKGROUND OF THE INVENTION

Field of the invention

This invention pertains to the field of art of chemistry combined with wave energy and more particularly to a device in which a chemical change in an organic substance is brought about by application of wave energy other than heat energy, such as gamma rays or X-rays.

Description of the prior art

Three patents issued to Lyman Chalkley are representative of the prior art known to the applicants. Patent Numbers 2,864,753, 2,877,167 and 2,936,276 to Chalkey in class 204 subclass 158 are directed to phototropic dyes which are utilized in liquid state as radiation detectors. Applicants have extended the usefulness of securing them to be in phototropic materials by solid state on aluminum oxide. The several new areas of usefulness will be more fully discussed in the following paragraphs.

SUMMARY OF THE INVENTION

The radiation indicator of this invention will provide an inexpensive accurate and convenient means of indicating gamma radiation levels.

Suitable materials were discovered by obtaining of a suitable chemical compound and appropriate anodic coating on aluminum and or magnesium. The anodic coating on aluminum, magnesium or titanium was chosen as the matrix to hold the chemical compared since it is durable and the coating can be varied by selecting the electrolyte and other variables for anodizing.

The suitability of the chemical compound such as a dye involves the selection of a chromophore sensitive to the radiation and an auxochrome to attach the dye molecule to the anodic coating formed. The chromophore should be such that there is little or no background effect by radiation other than that being measured.

Typical suitable dye families, which are applicable to the detection of gamma radiation are triarylmethanes, such as brilliant green semicarbazones, anils, spiropyrans, sydnone, and cyanuric compounds.

Current personal badge dosimeters are made from a silver halide emulsion film covered with a visible light shield. The film must be developed to indicate the amount of radiation received. The use of this type badge involves the development of the film and a shield, which are eliminated by the subject invention. The other most commonly used dosimeter is the Fricke solution indicator where the solution is held in a vial. This involves a direct barrier to the penetration of the radiation and may introduce errors by coloration of the vial.

The dye coating will be sensitive to gamma radiation. The quantitative characteristics, in the appropriate sensitivity range will be measured by a shift through a known spectral range resulting in a visible change. The color change will be as accurate as the operators comparison with a standard and will be instantly visible without further processing of the dyed coating.

The chemical compound in the anodic coating, may react to gamma radiation by any of the following phenomena, separately or in combination: being decomposed or breaking the chemical bonds, an electronic shift within the dye molecule, polymerization wih neighboring molecules, a tautomeric shift and acceptance of a proton from the hydrated oxide coating giving an acid/base reaction etc. These reactions are stimulated by the receipt of external energy or chemical stimuli from the source to be measured.

The result of the electronic shift or chemical change in the solid state of the indicator-oxide system provides for unique properties of the appropriately formulated anodic film. The appropriately formulated anodic coating allows external energy or chemical stimuli to impinge directly upon the sensitive coating to excite the chemical molecules. In addition, the sensitive coating may react as a hydrogen ion concentration indicator, and accept or reject the hydrogen available from the anodic coating which retains water as water of hydration. These reactions are spontaneous in the solid state, and are immediately applicable without further processing. A reaction available generally in the solid state is that where the chemical molecule may be decomposed or broken down by the external energy changing the coloration of the resulting coating. The converse may happen where the chemical molecules may polymerize to form a new compound within the anodic coating.

The above reactions all result in color changes which may be easily detected.

The practical applications for these gamma radiation sensitive coatings are to provide a variety of indicator systems for various radiation levels. Personal warning badges, monitors for experiments. Functionally useful indicator system fabricated into such items as light fixtures, grill work for air-condition systems, door knobs, etc., can make use of this invention. Boehmite or similar alumina compound, as well as the anodic coating (removed from the aluminum base) may be dyed to form a lake and the lake used as a pigment in paint plastic, or similar material to provide for further versatility in the use of the dye-anodic coating combination.

Appropriately formulated anodic coatings can be designed to react to any radiation excitation or chemical stimulation. For example, thermal energy supplied by an internal combustion engine providing a color change, an infrared source such as current military scopes allowing the coating to fluoresce, a shift in wave length of light source to receptor providing a method of decoding information recorded on the coating. The coating may be designed to capture high energy particles, atomic radiation, infrared radiation, ultraviolet radiation and the like and transform or adsorb the energy to provide a shielding mechanism much as the currently used thermally reflective coatings do, or to convert light energy to other useful forms of energy such as electrical.

Examples of this invention for chemical indicator purposes would include coating systems that were specifically designed to measure toxic and noxious gases and colloidal dispersions (both military and civilian) for example: carbon monoxide indicators for vehicles, smog indicators, methane indicators for mines, hydrogen sulfide in petroleum industry.

Selected chemical compounds may be combined with specific anodized aluminum and/or anodized magnesium coating to provide an inexpensive, accurate and widely applicable immediate indicating system for all forms of radiation and for chemical agents.

In addition selected chemical compounds may be combined with specific anodized aluminum and/or anodized magnesium coating to change, convert or direct the nature or characteristic of reflected or emitted radiation or light.

BRIEF DESCRIPTION OF THE DRAWING

The single figure shows a small portion of a structural element, such as a door frame made of aluminum 1 which has been anodized to form a barrier layer 2 and a perforated top section interspersed with literally thousands of pores 3. The anodized portion is aluminum oxide and, having pores, is absorptive of phototropic dyes 4 which are locked thereon by penetration of the pores 3. The surface seen at the top of the drawing is the surface utilized as a dosimeter. The aluminum base provides for the characteristics needed for badges, door knobs, door frames and other structural units.

DESCRIPTION OF THE PREFERRED EMBODIMENTS

An embodiment of brilliant green on aluminum oxide will change from a heavy blue green color to a much lighter blue green approaching colorlessness at 100 rads. At 1000 rads, the material will be colorless.

Other combinations of base metals and specific dyes produce similarly desirable results.

In accordance with this invention, the absorptive coating of metallic oxide which forms an anodic coating on the film support surface may be derived from at least one metal such as aluminum, magnesium and/or titanium. It has been found that the dye compounds in the triarylmethane family, the semicarbazone family, the anil family, the spiropyrans family and the sydnomes family, all possess the chromophore and auxochrome characteristics necessary to the anodic coating color change reaction which has been found to occur upon exposure to gamma radiation. The amount of gamma radiation necessary to produce the color change reaction, of course, determines the utility of the excessive radiation alarm device.

Obviously many modifications and variations of the present invention are possible in the light of the above teachings. It is therefore to be understood, that within the scope of the appended claim, the invention may be practiced otherwise than as specifically described.

We claim:

1. A radiation detection means comprising a film support surface with an absorptive coating of metallic oxide as an anodic coating thereon, said metallic oxide derived from a metal taken from the group consisting of aluminum, magnesium and titanium, and a gamma radiation sensitive dye compound chosen from the group of dye compounds consisting of dye compounds in the triarylmethane family, the semicarbazone family, the anil family, the spiropyrans family and the sydnomes family wherein said gamma radiation sensitive dye compound is absorbed by said anodic coating.

References Cited

UNITED STATES PATENTS

| | | | |
|---|---|---|---|
| 2,126,017 | 8/1938 | Jenny et al. | 204—35.1 |
| 2,766,119 | 10/1956 | Freedman et al. | 95—8 |
| 2,864,751 | 12/1958 | Chalkley | 204—158 |
| 2,895,892 | 7/1959 | Chalkley | 204—157 |
| 2,916,376 | 12/1959 | Ritter et al. | 96—93 |
| 3,181,461 | 5/1965 | Fromson | 101—149.2 |

JOHN H. MACK, Primary Examiner

W. B. VANSISE, Assistant Examiner

U.S. Cl. X.R.

204—58, 35; 250—83